(12) United States Patent
Ingebrand et al.

(10) Patent No.: US 10,335,810 B2
(45) Date of Patent: Jul. 2, 2019

(54) TWO COMPONENT MIXING MODULE

(71) Applicant: Graco Minnesota Inc., Minneapolis, MN (US)

(72) Inventors: John R. Ingebrand, New Prague, MN (US); Stanley G. Karwoski, Oakdale, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 323 days.

(21) Appl. No.: 14/767,129

(22) PCT Filed: Feb. 12, 2014

(86) PCT No.: PCT/US2014/015919
§ 371 (c)(1),
(2) Date: Aug. 11, 2015

(87) PCT Pub. No.: WO2014/126951
PCT Pub. Date: Aug. 21, 2014

(65) Prior Publication Data
US 2015/0367360 A1 Dec. 24, 2015

Related U.S. Application Data

(60) Provisional application No. 61/764,436, filed on Feb. 13, 2013.

(51) Int. Cl.
*B05B 7/04* (2006.01)
*B05B 1/30* (2006.01)
(Continued)

(52) U.S. Cl.
CPC .......... *B05B 7/0408* (2013.01); *B01F 15/026* (2013.01); *B05B 1/3013* (2013.01);
(Continued)

(58) Field of Classification Search
CPC ......... B05B 7/0408; B05B 7/32; B05B 15/55; B01F 15/026; B29B 7/7447; B29B 7/7642; B29B 7/7615; B29B 7/805
(Continued)

(56) References Cited

U.S. PATENT DOCUMENTS 368,762 A    8/1887    Gardner
2,970,773 A *    2/1961    Keryluk ................ B05B 7/1209
                                                                                                          118/608
(Continued)

FOREIGN PATENT DOCUMENTS

CN      1253515 A      5/2000
DE      3313287 A1    10/1984
(Continued)

OTHER PUBLICATIONS

Second Taiwanese Office Action, for Taiwanese Patent Application No. 103104654, dated Jul. 10, 2017, 10 pages.
(Continued)

*Primary Examiner* — Marc C Howell
(74) *Attorney, Agent, or Firm* — Kinney & Lange, P.A.

(57) ABSTRACT

A mixing module includes two inlets, an integrator, and a valve member. The integrator has two chambers each having a near end and a far end, and the valve member is movable between two positions. One of the inlets is connected to the near end of one of the chambers and the other inlet is connected to the near end of the other chamber when the valve is in one position. When the valve is in the other position, one of the inlets is disconnected from the chambers and the near ends of the chambers are connected.

12 Claims, 8 Drawing Sheets

(51) Int. Cl.
- *B05B 7/32* (2006.01)
- *B29B 7/74* (2006.01)
- *B29B 7/76* (2006.01)
- *B29B 7/80* (2006.01)
- *B01F 15/02* (2006.01)
- *B05B 15/55* (2018.01)

(52) U.S. Cl.
CPC .............. *B05B 1/3026* (2013.01); *B05B 7/32* (2013.01); *B05B 15/55* (2018.02); *B29B 7/7447* (2013.01); *B29B 7/7615* (2013.01); *B29B 7/7642* (2013.01); *B29B 7/7657* (2013.01); *B29B 7/801* (2013.01); *B29B 7/805* (2013.01); *B01F 2215/005* (2013.01)

(58) Field of Classification Search
USPC ......................................................... 366/138
See application file for complete search history.

(56) References Cited

U.S. PATENT DOCUMENTS

| | | | |
|---|---|---|---|
| 3,240,432 A | 3/1966 | Boettler | |
| 3,417,923 A | 12/1968 | Carlson | |
| 3,437,273 A * | 4/1969 | Hagfors | B05B 7/1209 239/414 |
| 3,841,555 A * | 10/1974 | Lilja | A45D 19/00 137/625.18 |
| 3,873,023 A | 3/1975 | Moss et al. | |
| 4,129,231 A * | 12/1978 | Larson | B05B 7/0408 222/145.5 |
| 4,355,739 A | 10/1982 | Vierkotter | |
| 4,407,431 A | 10/1983 | Hutter, III | |
| 4,760,956 A | 8/1988 | Mansfield | |
| 4,967,956 A | 11/1990 | Mansfield | |
| 5,398,846 A | 3/1995 | Corba et al. | |
| D368,762 S | 4/1996 | Buergi et al. | |
| 5,713,519 A | 2/1998 | Sandison et al. | |
| 7,025,286 B1 * | 4/2006 | Langeman | B05B 7/0093 239/11 |
| 7,954,673 B2 | 6/2011 | Kosmyna et al. | |
| 2005/0103889 A1 * | 5/2005 | Langeman | B05B 7/0093 239/303 |
| 2007/0034716 A1 | 2/2007 | Zittel et al. | |

FOREIGN PATENT DOCUMENTS

| | | |
|---|---|---|
| EP | 1402957 A2 | 3/2004 |
| JP | S6451129 A | 2/1989 |
| JP | 2513475 B2 | 7/1996 |
| JP | 2513486 B2 | 7/1996 |
| WO | 88/03052 A1 | 5/1988 |

OTHER PUBLICATIONS

The International Search Report dated May 21, 2014 for International Application No. PCT.US2014/015919.
Extended European Search Report, for European Patent Application No. 14751200.8, dated Oct. 26, 2016, 8 pages.
First Chinese Office Action, for Chinese Patent Application No. 201480008699.4, dated Oct. 10, 2016, 17 pages.
Taiwanese Office Action, for Taiwanese Patent Application No. 103104654, dated Mar. 17, 2017, 12 pages.
Second Chinese Office Action, for Chinese Patent Application No. 201480008699.4, dated Jul. 4, 2017, 15 pages.
Third Taiwan Office Action for Taiwan Patent Application No. 103104654, dated Jan. 18, 2018, 12 pages.

* cited by examiner

TWO COMPONENT MIXING MODULE

CROSS-REFERENCE TO RELATED APPLICATION(S)

This application claims the benefit of U.S. Provisional Application No. 61/764,436 filed Feb. 13, 2013 for "Two Component Mixing Module" by John R. Ingebrand and Stanley G. Karwoski, and claims the benefit of PCT application PCT/US2014/015919 filed Feb. 12, 2014 for "Two Component Mixing Module" by John R. Ingebrand and Stanley G. Karwoski.

BACKGROUND

The present invention relates to plural component dispensing systems, and more particularly to a mixing module for a plural component dispensing system.

Typically, a plural component dispensing system uses a resin component which is chemically inert in its isolated form, and an isocyanate catalyst material which is also chemically inert in its isolated form. When the catalyst and the resin are combined, an immediate chemical reaction begins taking place that results in the cross-linking, curing, and solidification of the mixture. As the chemical reaction takes place, but before it has progressed too far, the mixed material can be dispensed or sprayed into its intended form and/or position. Such a plural component dispensing system can be used to spray paint onto an article.

Due to the chemical reaction between the resin and the catalyst, the two components are stored separately and mixed in specific proportions immediately in time prior to use. The mixing traditionally has occurred adjacent to where the components are stored, which can be a substantial distance from where the mixture is dispensed. This is especially true in the case of a spray paint booth where the components are stored outside of the booth and the paint application occurs inside the booth. In such an arrangement, the mixed paint may have to travel 50 feet prior to being sprayed.

When dispensing of the mixture is suspended or completed or when the mixture must be changed (e.g., to create a different paint color), the material that is already mixed must be flushed from the dispensing system using a solvent. The flushed mixture is generally discarded, creating waste, and the solvent is generally not reused, creating more waste. Also, the flushing process takes time to complete, which occupies the dispensing system and prevents it from being used productively.

SUMMARY

According to one embodiment of the present invention, a mixing module includes two inlets, an integrator, and a valve member. The integrator has two chambers each having a near end and a far end, and the valve member is movable between two positions. One of the inlets is connected to the near end of one of the chambers and the other inlet is connected to the near end of the other chamber when the valve is in one position. When the valve is in the other position, one of the inlets is disconnected from the chambers and the near ends of the chambers are connected.

In another embodiment, a method of operating a mixing module includes positioning a valve member in a mix position. Resin is flowed through a resin inlet into a resin chamber of an integrator. Catalyst is flowed through a catalyst inlet into a catalyst chamber of the integrator. The resin and catalyst are mixed. The valve member is moved to a flush position to fluidly connect the resin chamber and the catalyst chamber to a single inlet and to block flow of the resin and/or the catalyst. Solvent is flowed from the single inlet through the resin chamber and the catalyst chamber.

DETAILED DESCRIPTION

Figure 1:
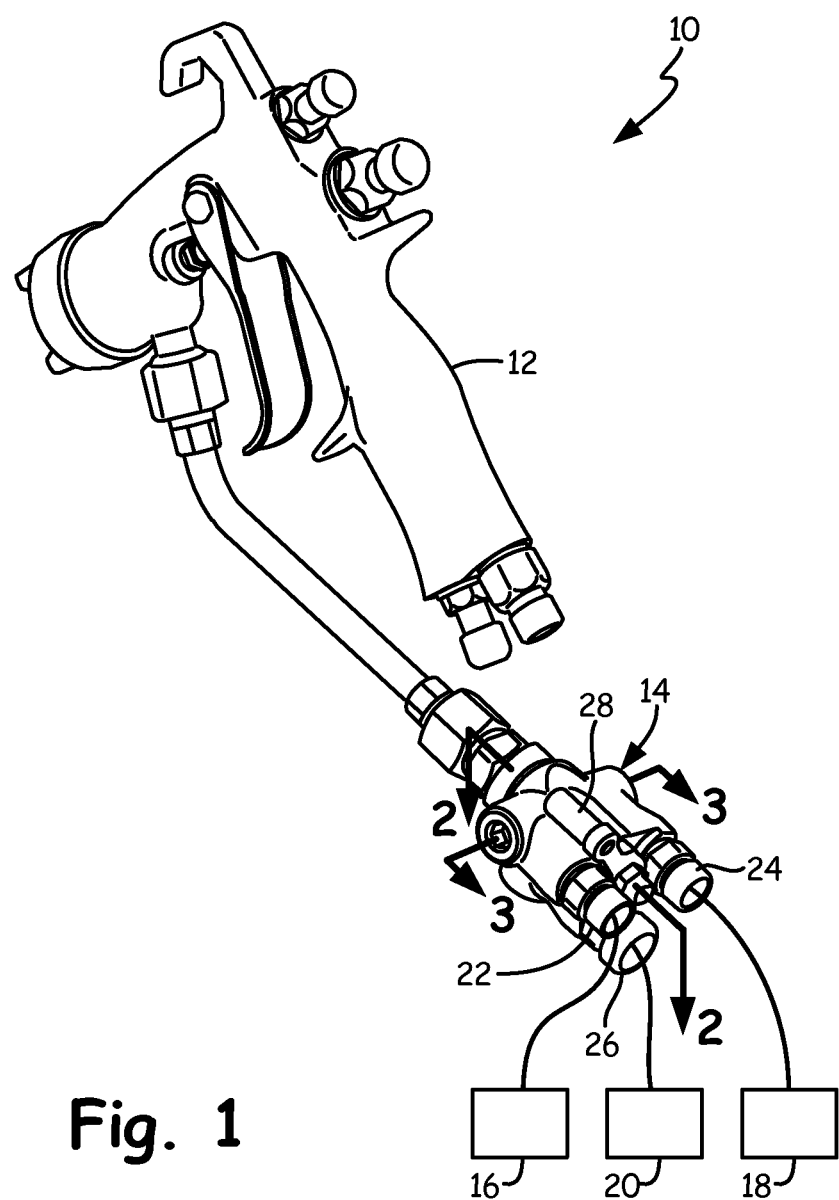
FIG. 1 is a rear perspective view of a plural component dispensing system including a mixing module.

FIG. 1 is a rear perspective view of plural component dispensing system 10. In the illustrated embodiment, dispensing system 10 includes dispensing gun 12, mixing module 14, resin source 16, catalyst source 18, and solvent source 20. Dispensing gun 12 is fluidly connected to mixing module 14. Mixing module 14 is fluidly connected to resin source 16, catalyst source 18, and solvent source 20 at resin inlet 22, catalyst inlet 24, and solvent inlet 26, respectively. Mixing module 14 also includes handle 28 that is movable between three positions: mix, all-off, and flush.

Resin source 16 contains a pressurized fluid, such as polyurethane mixed with a colorizing agent. Catalyst source 18 contains a different pressurized fluid, such as isocyanate, which is mixed with the resin in a wide variety of ratios such as 0.1:1 to 50:1 depending on the application. Solvent source 20 contains yet another pressurized fluid, such as methyl ethyl ketone, that can dissolve the resin and the catalyst for cleaning purposes.

When handle 28 is in the mix position and dispensing gun 12 is actuated, resin and catalyst flow into mix module 14 where they are combined before flowing together as a mixture through dispensing gun 12. When handle 28 is in the all-off position, fluid does not flow through dispensing system 10. When handle 28 is in the flush position and dispensing gun 12 is actuated, solvent flows through mix module 14 and out of dispensing gun 12. In this mode, the solvent displaces substantially all of the mixed material in dispensing system 10 so that it does not solidify and internally block dispensing system 10.

The components and configuration of plural component dispensing system 10 as shown in FIG. 1 allow for the resin and the solvent to be mixed proximate to dispensing gun 12. This is because mixing module 14 is small enough to attach to dispensing gun 12 and/or to a user's belt (not shown), both of which are within a few feet of the dispensing point. In addition, dispensing system 10 can be flushed of any mixed material using solvent.

Figure 2:
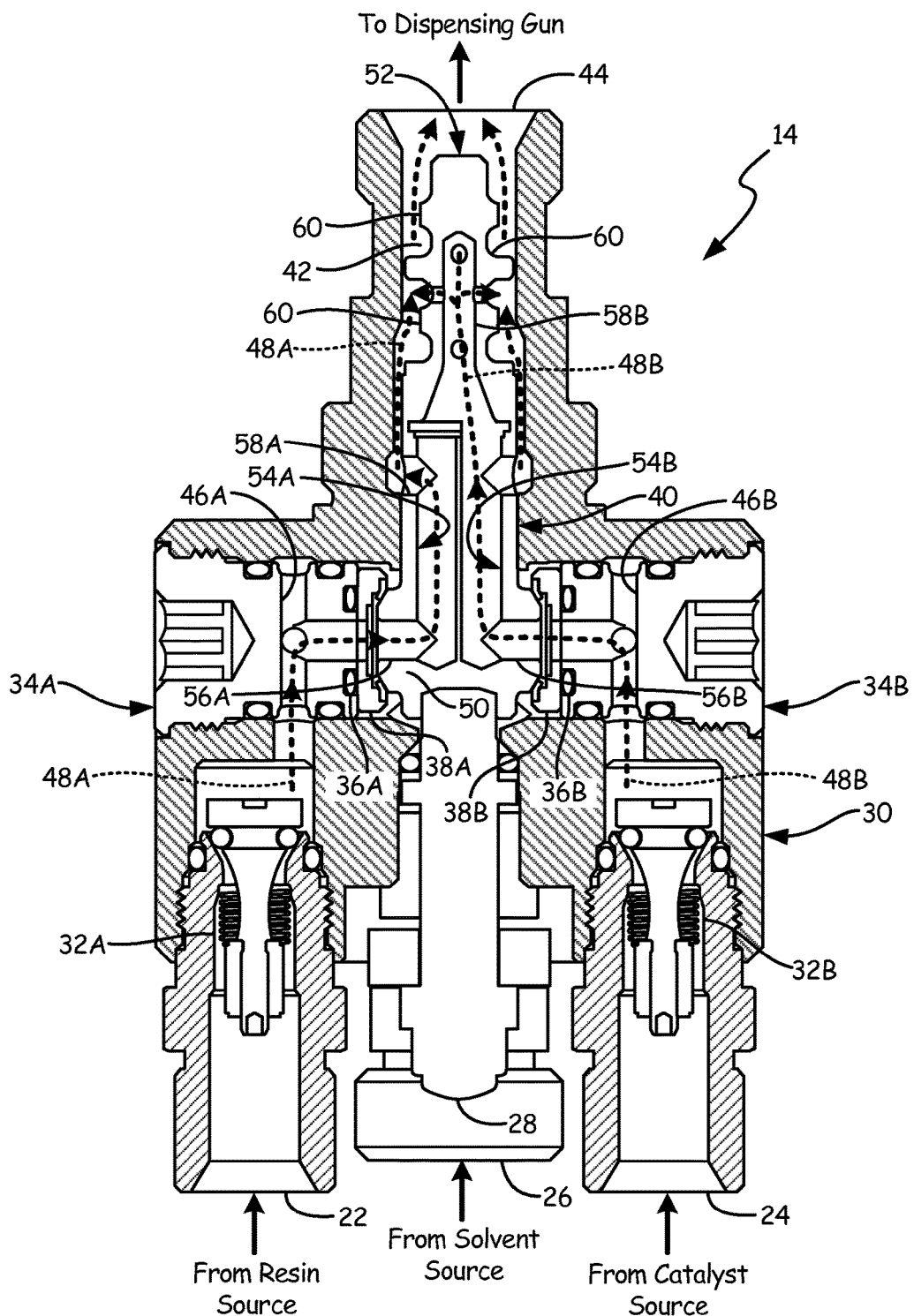
FIG. 2 is a cross-sectional view of the mixing module along line 2-2 in FIG. 1.

FIG. 2 is a cross-sectional view of mixing module 14 along line 2-2 in FIG. 1. In the illustrated embodiment, mixing module 14 includes body 30 which has a hollow core into which several components are positioned and/or affixed. Handle 28, check valves 32A and 32B, seat plugs 34A and 34B, O-rings 36A and 36B, seats 38A and 38B, and ball valve mixer 40 are at least partially positioned inside body 30.

More specifically, check valves 32A and 32B are attached to and extend into the rear of body 30 and include resin inlet 22 and catalyst inlet 24, respectively. Seat plugs 34A and 34B are attached to and extend into the sides of body 30 and are positioned downstream of check valves 32A and 32B, respectively. Ball valve mixer 40 is rotatably positioned within body 30, downstream of seat plugs 34A and 34B, and extends forward into mix area 42. Downstream of mix area 42 is outlet 44 which is at the front end of mixing module 14.

Seat plugs 34A and 34B include flow paths 46A and 46B that allow flow from check valves 32A and 32B, respectively, to reach ball valve mixer 40 along flow lines 48A and 48B. O-rings 36A and 36B and seats 38A and 38B are positioned between seat plugs 34A and 34B and ball valve mixer 40, respectively. This arrangement exerts force on ball valve mixer 40, which seals flow as it transitions from flow paths 46A and 46B to ball valve mixer 40 while allowing ball valve mixer 40 to rotate with handle 28.

In the illustrated embodiment, ball valve mixer 40 includes valve member 50, integrator 52, and chambers 54A and 54B. Valve member 50 has a flat end with a substantially spherical portion forward thereof. This substantially spherical exterior portion engages seats 38A and 38B, which also have corresponding spherical exterior portions facing valve member 50. Chambers 54A and 54B extend within ball valve mixer 40 from proximal ends 56A and 56B (located at valve member 50) to distal ends 58A and 58B (located at integrator 52). Integrator 52 extends into mix area 42 and has circumferential ridges 60 that are interrupted at various positions so mix area 42 is fluidly connected to outlet 44.

Handle 28, ball valve mixer 40, and valve member 50 are shown in the mix position in FIG. 2. As stated previously, when dispensing gun 12 (shown in FIG. 1) is actuated, resin and catalyst simultaneously flow through the various ducts within mixing module 14. More specifically, resin flows into resin inlet 22 and through check valve 32A. From there the resin flows along flow line 48A, through body 30 and flow path 46A, and into proximal end 56A of chamber 54A. The resin then flows up through chamber 54A, out through distal end 58A, and into mix area 42. Similarly, catalyst flows into catalyst inlet 24 and through check valve 32B. From there the catalyst flows along flow line 48B, through body 30 and flow path 46B, and into proximal end 56B of chamber 54B. The catalyst then flows up through chamber 54B, out through distal end 58B, and into mix area 42. The resin and the catalyst combine in mix area 42, flow past circumferential ridges 60, and exit mixing module 14 through outlet 44.

The components and configuration of mixing module 14 as shown in FIG. 2 allow for resin and catalyst to flow into mixing module 14 separately and to exit mixed together. Also, mixing module 14 is compact and lightweight so that it is not burdensome to be attached to dispensing gun 12 (shown in FIG. 1) or to a user's belt (not shown). In addition, the force on ball valve mixer 40 from seats 38A and 38B provides sufficient sealing pressure to prevent leaks within mixing module 14 even if the resin and/or catalyst is at high pressure. Furthermore, the force on ball valve mixer 40 from seats 38A and 38B generates enough friction to make it difficult to move handle 28 between positions inadvertently.

Figure 3:
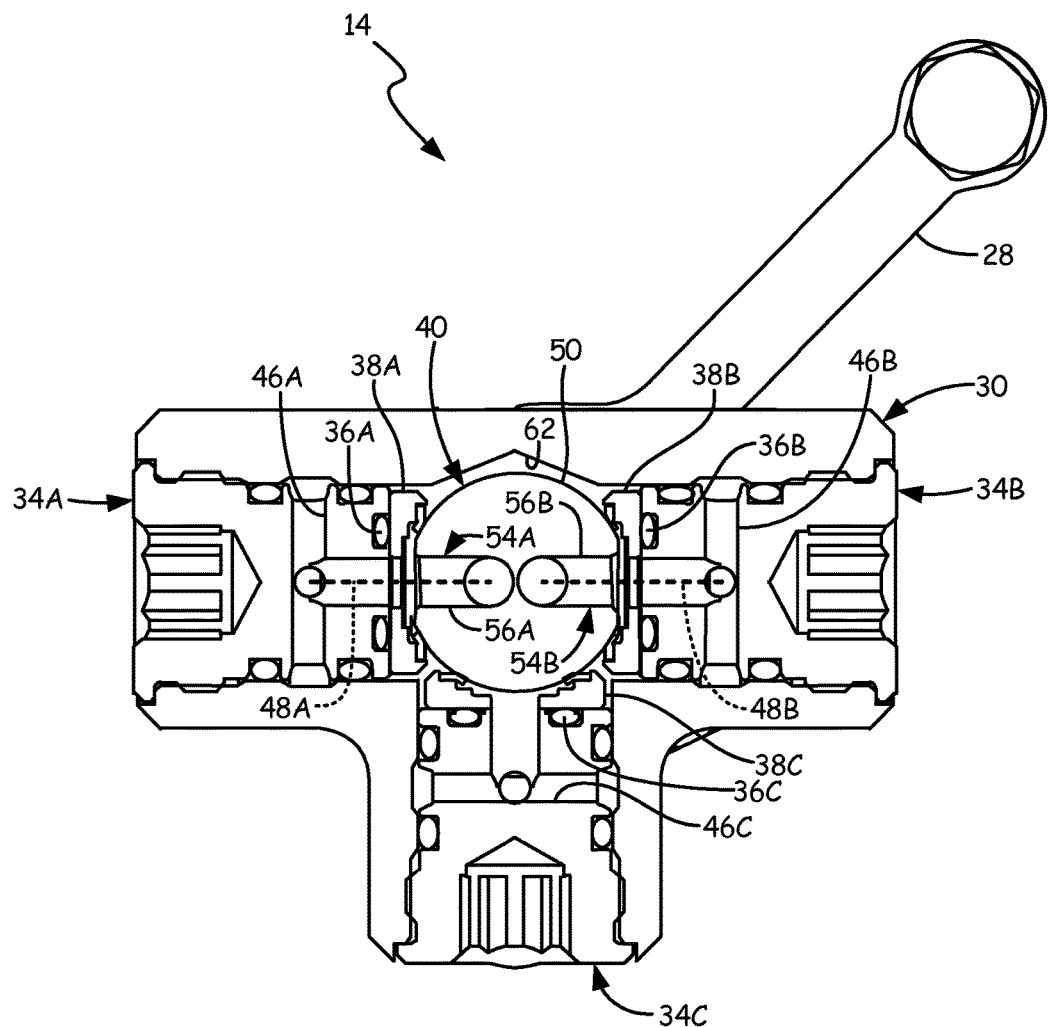
FIG. 3 is a cross-sectional view of the mixing module along line 3-3 in FIG. 1 with a valve member in a mix position.

FIG. 3 is a cross-sectional view of mixing module 14 along line 3-3 in FIG. 1 with valve member 50 in the mix position. The components and configuration of mixing module 14 are as described with respect to FIGS. 1 and 2, with additional features being visible from this viewpoint. For example, valve member 50 is rotatably positioned within body cavity 62 of body 30.

For another example, seat plug 34C (having flow path 46C) is attached to and extends into a hollow portion of the bottom side of body 30. Seat plug 34C is downstream of solvent inlet 26 (shown in FIG. 2) and check valve 32C (not shown). In addition, O-ring 36C and seat 38C are positioned between seat plug 34C and valve member 50 of ball valve mixer 40. This arrangement exerts force on ball valve mixer 40, which seals flow as it transitions from flow path 46C into valve member 50 while allowing ball valve mixer 40 to rotate with handle 28.

In the illustrated embodiment, flow path 46C (as well as solvent inlet 26, shown in FIG. 2) is fluidly disconnected from chambers 54A and 54B, and flow of solvent is blocked by valve member 50. On the other hand, flow path 46A (as well as resin inlet 22, shown in FIG. 2) is fluidly connected to proximal end 56A of chamber 54A, and flow path 46B (as well as catalyst inlet 24, shown in FIG. 2) is fluidly connected to proximal end 56B of chamber 54B. Therefore, resin and catalyst are allowed to flow through mixing module 14 along flow lines 48A and 48B, respectively, when dispensing gun 12 (shown in FIG. 1) is actuated.

Figure 4:
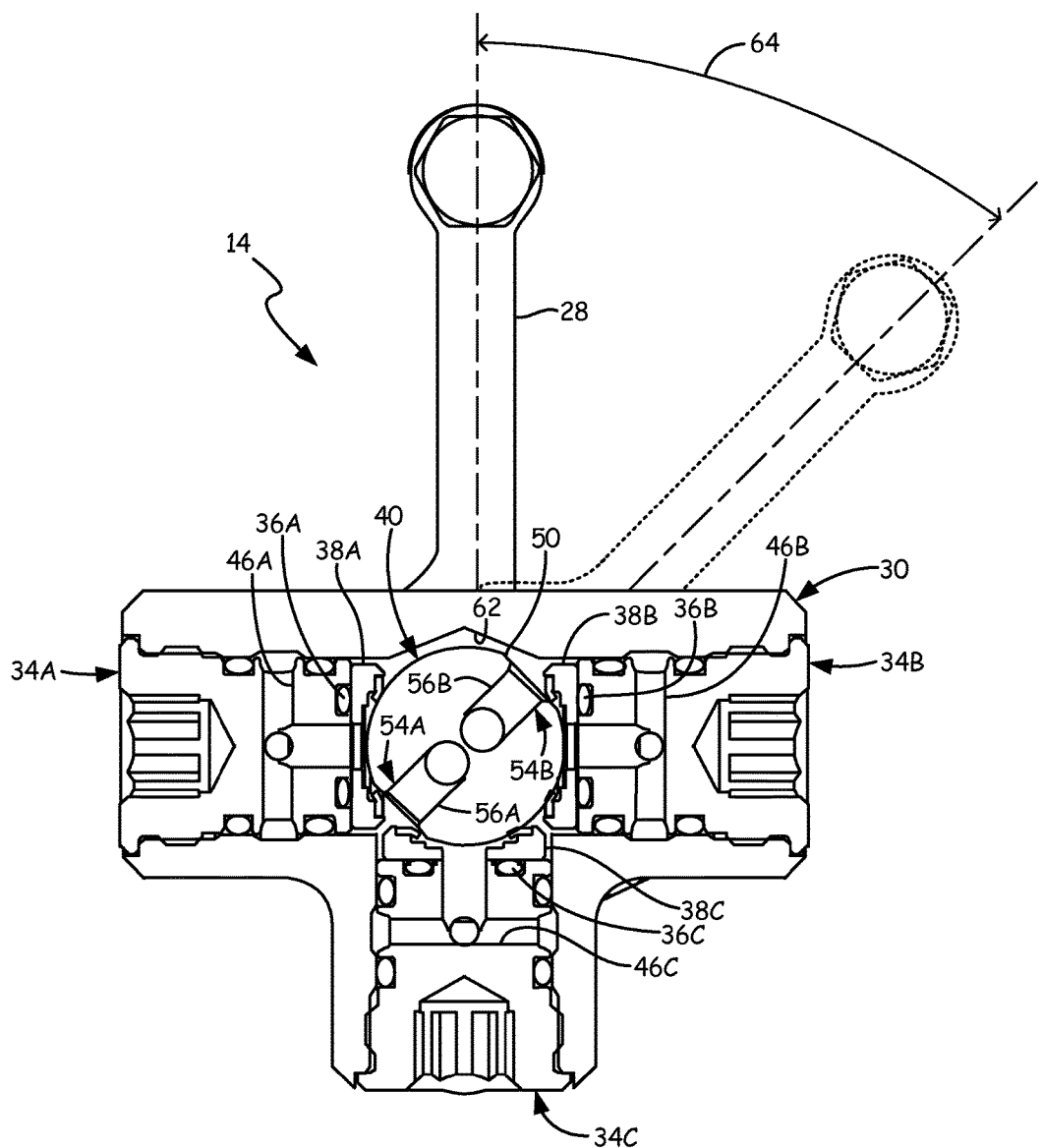
FIG. 4 is a cross-sectional view of the mixing module along line 3-3 in FIG. 1 with the valve member in an all-off position.

FIG. 4 is a cross-sectional view of mixing module 14 along line 3-3 in FIG. 1 with valve member 50 in the all-off position. In the illustrated embodiment, the all-off position is achieved by rotating handle 28 about 45 degrees from the mix position along arc 64, which also turns ball valve mixer 40 and changes the orientation of valve member 50. In this position, flow paths 46A, 46B, and 46C are all fluidly disconnected from chambers 54A and 54B, and flow of resin, catalyst, and solvent is blocked by valve member 50.

Figure 5:
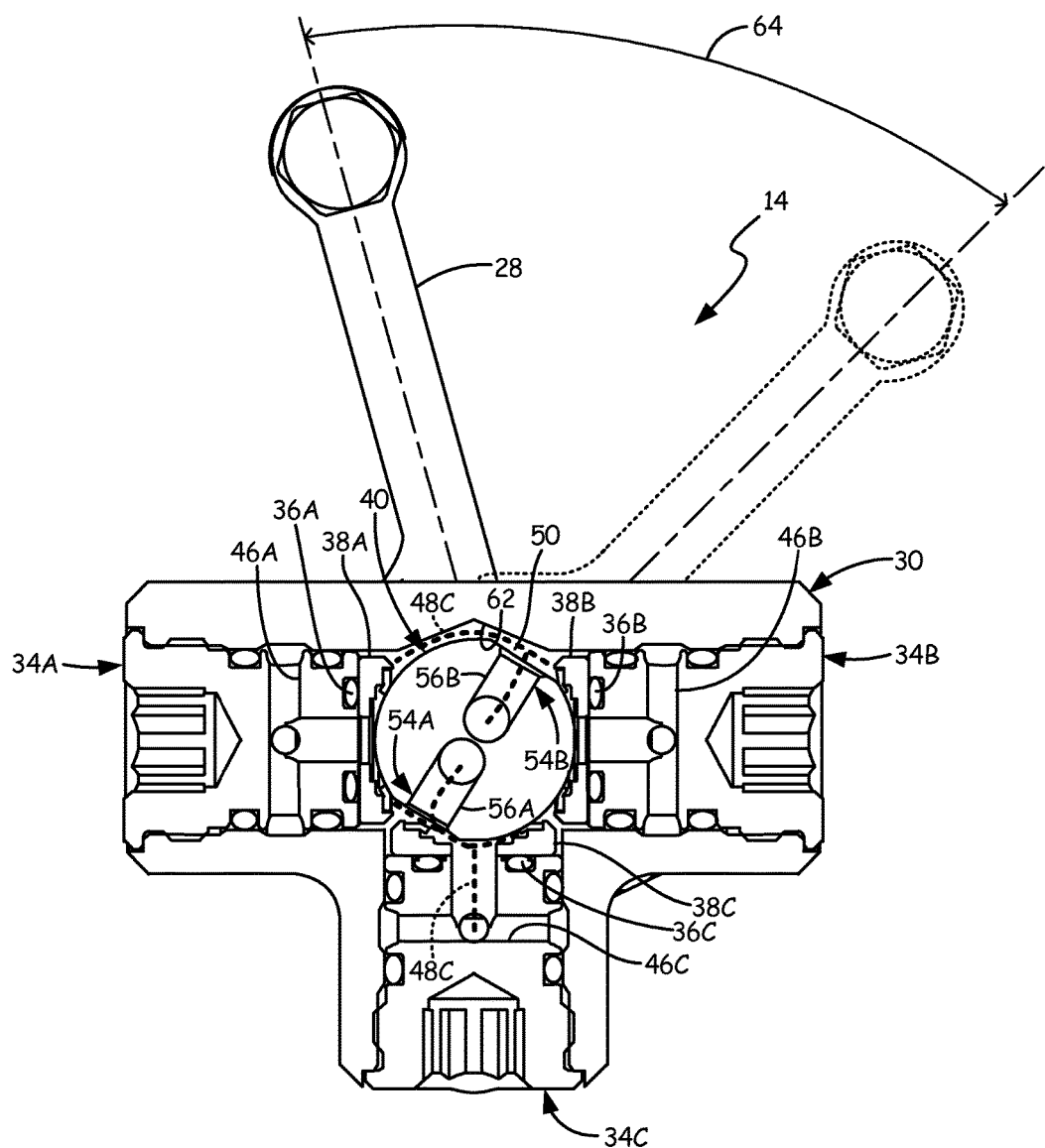
FIG. 5 is a cross-sectional view of the mixing module along line 3-3 in FIG. 1 with the valve member in a flush position.

FIG. 5 is a cross-sectional view of the mixing module 14 along line 3-3 in FIG. 1 with valve member 50 in the flush position. In the illustrated embodiment, the flush position is achieved by rotating handle 28 about 60 degrees from the mix position along arc 64, which also turns ball valve mixer 40 and changes the orientation of valve member 50. This action simultaneously fluidly connects proximal ends 56A and 56B to solvent inlet 26 (shown in FIG. 2) and fluidly disconnects resin inlet 22 and catalyst inlet 24 (both shown in FIG. 2) from chambers 54A and 54B, respectively. More specifically, flow paths 46A and 46B are fluidly disconnected from chambers 54A and 54B, and the flow of resin and catalyst is blocked by valve member 50. On the other hand, flow path 46C (as well as solvent inlet 26) is fluidly connected to proximal end 56A of chamber 54A and proximal end 56B of chamber 54B via body cavity 62. Body cavity 62 is a portion of the hollow core of body 30 which extends around valve member 50 (and is also visible in FIG. 2). Therefore, solvent is allowed to flow through mixing module 14 along flow line 48C when dispensing gun 12 (shown in FIG. 1) is actuated. In the illustrated embodiment, the solvent flow through chambers 54A and 54B is balanced, so the flow rates of both the resin and the catalyst will be equal during flush mode (assuming the resin and catalyst viscosities are substantially the same).

The components and configuration of mixing module 14 as shown in FIGS. 3-5 allow for mixing module 14 to be in mix mode, all-off mode, or flush mode. This occurs because ball valve mixer 40 includes valve member 50, and chambers 54A and 54B can be fluidly connected or disconnected to resin inlet 22 and catalyst inlet 24, respectively. Chambers 54A and 54B can also be fluidly connected or disconnected to each other at proximal ends 56A and 56B, respectively, as well as to solvent inlet 26. In addition, body cavity 62 is filled with solvent after first time mixing module 14 is flushed, which prevents resin and catalyst from leaking into body cavity 62, mixing, and solidifying.

Depicted in FIGS. 1-5 is one embodiment of the present invention, to which there are alternative embodiments. For example, the various internal ducts within mixing module 14 (for example, flow paths 46A and 46B and chambers 54A and 54B) can be differently sized depending on the required mixture ratio of resin to catalyst and/or to accommodate differing viscosities of the two materials. For another example, mixing module 14 can only include resin inlet 22 and catalyst inlet 24. In such an embodiment, solvent inlet 26 would be absent, so solvent source 20 would be temporarily connected to one of resin inlet 22 and catalyst inlet 24 in order to flush plural component dispensing system 10 of mixed material.

Figure 6:
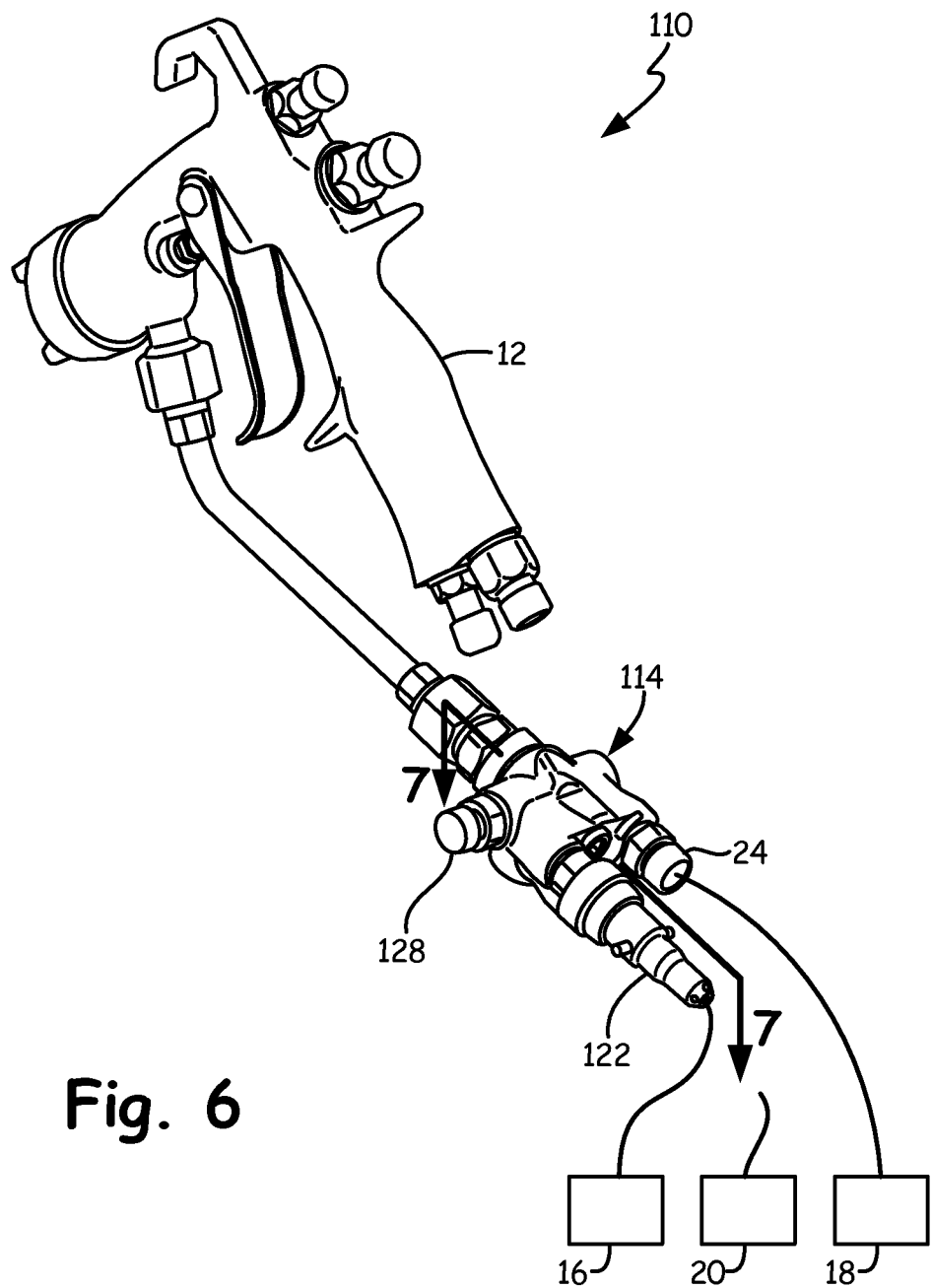
FIG. 6 is a rear perspective view of an alternate embodiment plural component dispensing system including an alternate embodiment mixing module.

FIG. 6 is a rear perspective view of an alternate embodiment plural component dispensing system 110. In the illustrated embodiment, dispensing system 110 includes dispensing gun 12, mixing module 114, resin source 16, catalyst source 18, and solvent source 20. Dispensing gun 12 is fluidly connected to mixing module 114. Mixing module 114 is fluidly connected to resin source 16 and catalyst source 18 at quick detach inlet 122 and catalyst inlet 24, respectively. In general, quick detach inlet 122 functions as a resin inlet, although solvent source 20 is connectable to quick detach inlet 122 in order to flush mixing module 114. Quick detach inlet 122 is configured to be rapidly connectable and disconnectable to various fluid sources, although only one source can be connected at a time to quick detach inlet 122. Mixing module 114 also includes knob 128 that is movable between two positions: mix and flush.

When knob 128 is in the mix position and dispensing gun 12 is actuated, resin and catalyst flow into mix module 114 where they are combined before flowing together as a mixture through dispensing gun 12. When knob 128 is in the flush position, solvent source 20 is connected to quick detach inlet 122, and dispensing gun 12 is actuated, solvent flows through mix module 114 and out of dispensing gun 12. In this mode, the solvent displaces substantially all of the mixed material in dispensing system 110 so that it does not solidify and internally block dispensing system 110.

The components and configuration of plural component dispensing system 110 as shown in FIG. 6 allow for the resin and the solvent to be mixed proximate to dispensing gun 12. This is because mixing module 114 is small enough to attach to dispensing gun 12 and/or to a user's belt (not shown), both of which are within a few feet of the dispensing point. In addition, solvent source 20 can be connected to mixing module 114 in order to flush dispensing system 110 of any mixed material. Furthermore, alternate resin sources 16 (not shown) can be connected to mix module 114 via quick detach inlet 122, for example, if different colors are required to be used.

Figure 7:
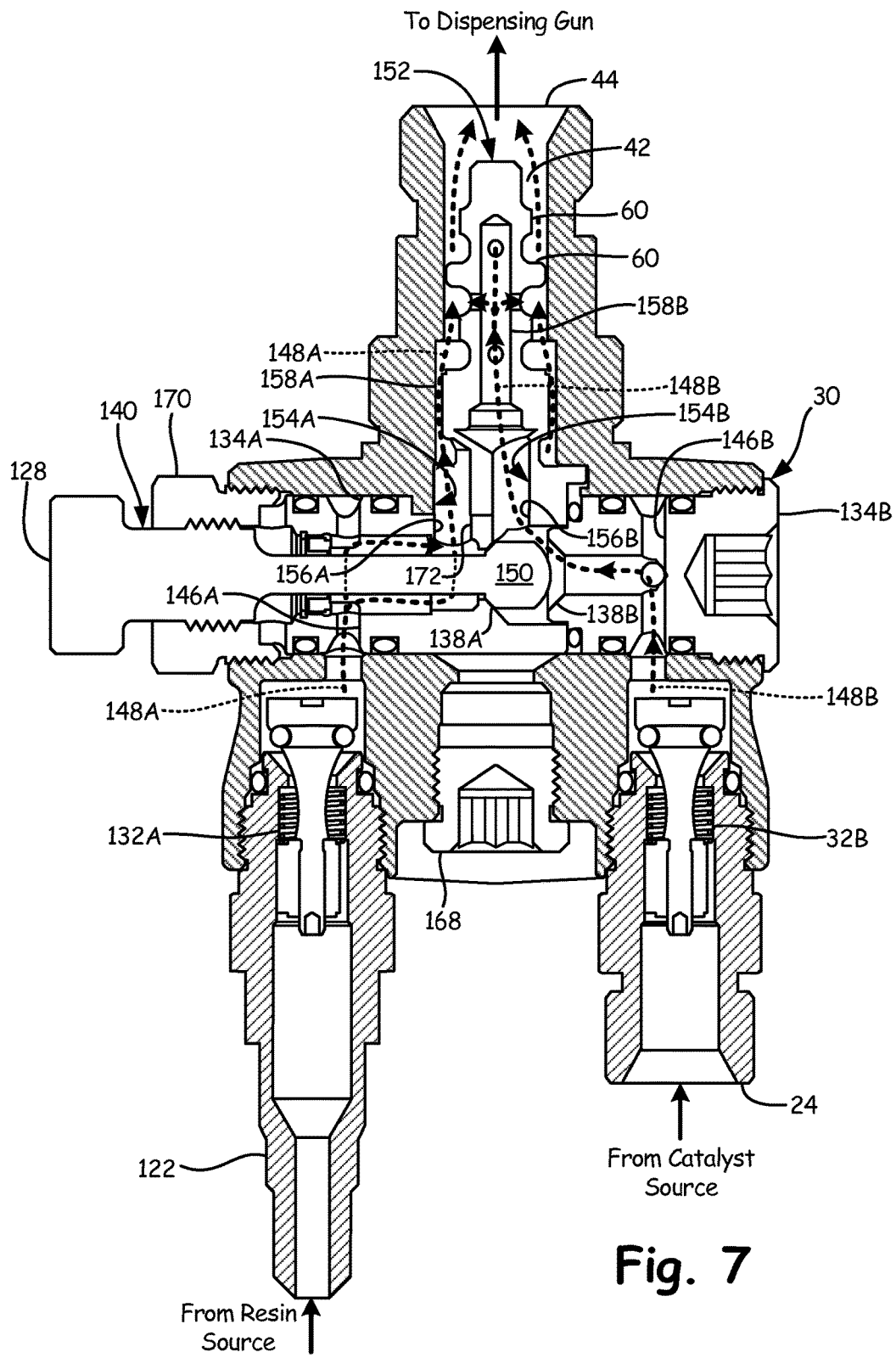
FIG. 7 is a cross-sectional view of the alternate embodiment mixing module along line 7-7 in FIG. 6 with an alternate embodiment valve member in an open position.

FIG. 7 is a cross-sectional view of alternate embodiment mixing module 114 along line 7-7 in FIG. 6 with alternate embodiment valve member 150 in an open position. In the illustrated embodiment, mixing module 114 includes body 30 which has a hollow core into which several components are positioned and/or affixed. Check valves 132A and 32B, seat plugs 134A and 134B, ball stem 140, integrator 152, blank plug 168, and plug cap 170 are at least partially positioned inside body 30.

More specifically, check valves 132A and 32B are attached to and extend into the rear of body 30 and include quick detach inlet 122 and catalyst inlet 24, respectively. In addition, blank plug 168 is inserted into body 30 because alternate embodiment mixing module 114 can use the same body 30 as mixing module 14 (shown in FIG. 2), but mixing module 114 does not need handle 28. In addition, another blank plug is used where solvent inlet 26 was, although that blank plug is not visible in FIG. 7.

Seat plug 134B is attached to and extends into the side of body 30 and is positioned downstream of check valve 32B. Seat plug 134B includes flow path 146B that allows flow from check valve 32B to reach proximal end 156B of chamber 154B (as denoted by flow line 48B). Seat plug 134B also includes seat 138B at its innermost end. On the opposite side of body 30, plug cap 170 is attached to and extends into the side of body 30. Plug cap 170 retains seat plug 134A which is positioned in body 30 downstream of check valve 132A. Seat plug 134A includes flow path 146A that allows flow from check valve 132A to reach proximal end 156A of chamber 154A (as denoted by flow line 48A). Seat plug 134A also includes septum 172 with seat 138A at its innermost end.

In addition, plug cap 170 includes a threaded bore that engages ball stem 140. Ball stem 140 is partially rotatably positioned within body 30 and plug cap 170 and extends sideways past septum 172. Ball stem 140 has an elongated shape with knob 128 at its outermost end and valve member 150 at its innermost end. Valve member 150 has a substantially spherical exterior portion configured to engage seats 138A and 138B. As shown in FIG. 7, ball stem 140 positioned outward to its maximum extent such that valve member 150 is engaging seat 138A.

Integrator 152 is downstream of seat plugs 134A and 134B. Integrator 152 includes chambers 154A and 154B that extend within integrator 152 from proximal ends 156A and 156B to distal ends 158A and 158B. In the illustrated embodiment, valve member 150 is fluidly disconnecting proximal ends 156A and 156B from each other. In addition, integrator 52 extends into mix area 42 and has circumferential ridges 60 that are interrupted at various positions so mix area 42 is fluidly connected to outlet 44 at the front end of mixing module 114.

Knob 128, ball stem 140, and valve member 150 are shown in the mix position in FIG. 7. As stated previously, when dispensing gun 12 (shown in FIG. 6) is actuated, resin and catalyst simultaneously flow through the various ducts within mixing module 114. More specifically, resin flows into quick detach inlet 122 and through check valve 132A. From there the resin flows along flow line 148A, through body 30 and flow path 146A, around and alongside ball stem 140, and into proximal end 156A of chamber 154A. The resin then flows up through chamber 154A, out through distal end 158A, and into mix area 42. Similarly, catalyst flows into catalyst inlet 24 and through check valve 32B. From there the catalyst flows along flow line 148B, through body 30 and flow path 146B, past valve member 150, and into proximal end 156B of chamber 154B. The catalyst then flows up through chamber 154B, out through distal end 158B, and into mix area 42. The resin and the catalyst combine in mix area 42, flow past circumferential ridges 60, and exit mixing module 114 through outlet 44.

Figure 8:
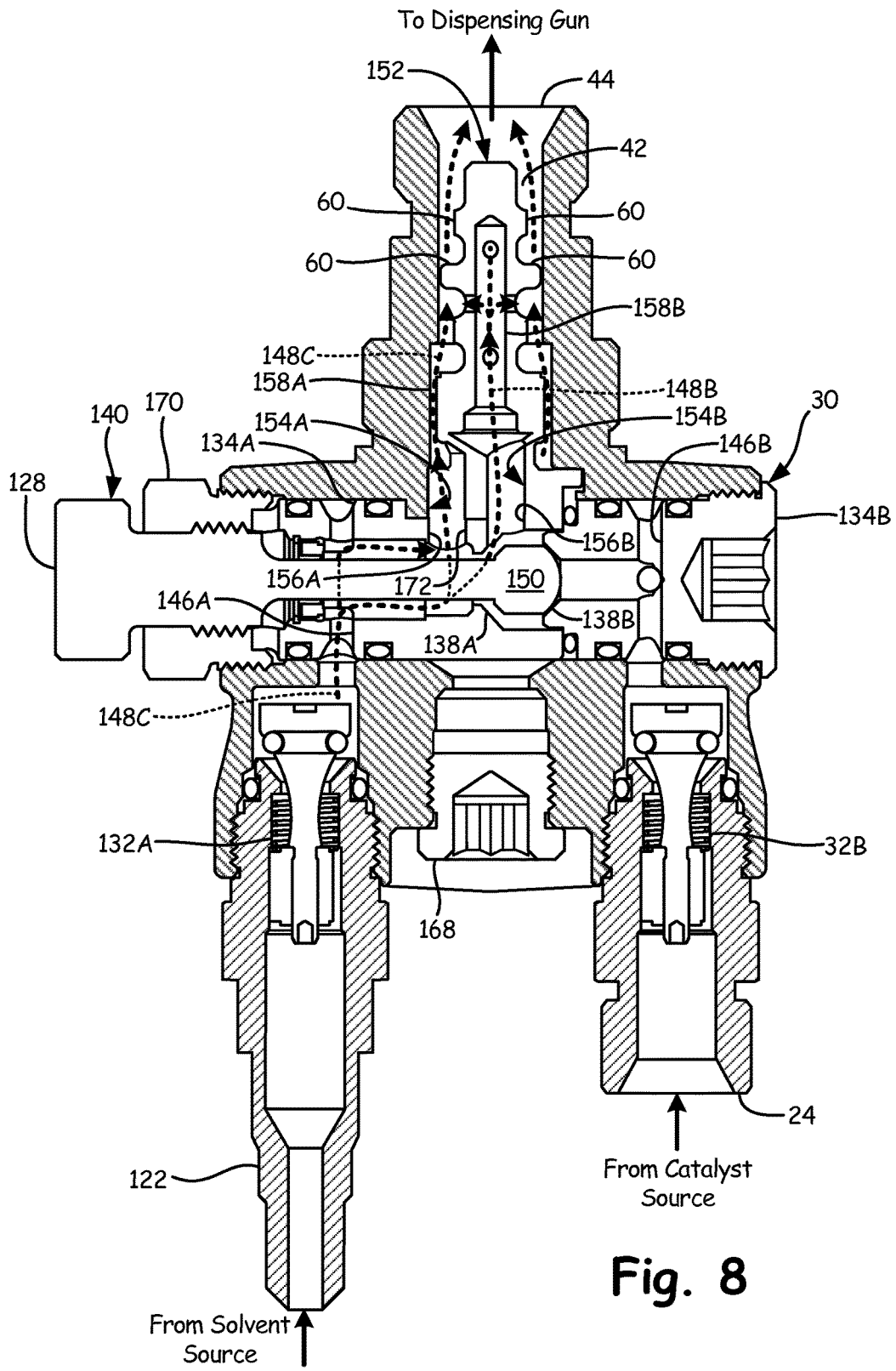
FIG. 8 is a cross-sectional view of the alternate embodiment mixing module along line 7-7 in FIG. 6 with the alternate embodiment valve member in a closed position.

FIG. 8 is a cross-sectional view of alternate embodiment mixing module 114 along line 7-7 in FIG. 6 with alternate embodiment valve member 150 in a closed position. In addition, resin source 16 (shown in FIG. 6) has been disconnected from quick detach inlet 122, and solvent source 20 (shown in FIG. 6) has been connected to quick detach inlet 122.

In the illustrated embodiment, the flush position is achieved by twisting knob 128 about 720 degrees from the mix position, which also twists ball stem 140 and translates valve member 150 laterally. This action simultaneously fluidly connects proximal ends 156A and 156B and fluidly disconnects catalyst inlet 24 (shown in FIG. 6) from both chambers 154A and 154B. More specifically, valve member 150 engages seat 138B and flow path 146B is fluidly disconnected from chambers 154A and 154B, and the flow of catalyst is blocked by valve member 150. On the other hand, flow path 146A (as well as quick detach inlet 122) is fluidly connected to proximal end 156A of chamber 154A and proximal end 156B of chamber 154B. Therefore, solvent is allowed to flow through mixing module 114 along flow line 148C when dispensing gun 12 (shown in FIG. 6) is actuated.

The components and configuration of mixing module 114 as shown in FIGS. 6-8 allow for resin and catalyst to flow into mixing module 114 separately and to exit mixed together. Also, mixing module 114 is compact and lightweight so that it is not burdensome to be attached to dispensing gun 12 (shown in FIG. 6) or to a user's belt (not shown). Furthermore, mixing module 114 can be placed in mix mode or flush mode. This occurs because ball stem 140 includes valve member 50, and chamber 154B can be fluidly connected or disconnected to catalyst inlet 24. Chambers 154A and 154B can also be fluidly connected or disconnected to each other at proximal ends 156A and 156B, respectively. In addition, the force on valve member 150 from seats 138A and 138B provide sufficient sealing pressure to prevent leaks within mixing module 114 even if the resin, catalyst, and/or solvent is at high pressure.

Depicted in FIGS. 6-8 is one embodiment of the present invention, to which there are alternative embodiments. For example, the various internal ducts within mixing module 114 (for example, flow paths 146A and 146B and chambers 154A and 154B) can be differently sized depending on the required mixture ratio of resin to catalyst and/or to accommodate differing viscosities of the two materials. For another example, catalyst inlet 24 can have a quick detach configuration such that solvent source 20 is connected to catalyst inlet 24 for flushing mixing module 114. In such a configuration, seat plug 134B would switch places with seat plug 134A, plug cap 170, and ball stem 140. For a further example, body 30 could have a solid rear center portion, such that blank plug 168 is not necessary. Similarly, body 30 could be devoid of the third separate connection for solvent inlet 26 (shown in FIG. 1). For yet another example, valve member 150 can be translated by another mechanism other than the threaded arrangement between ball stem 140 and plug cap 170, such as a quick turn thread, a cam, locking detents, and/or a pneumatic piston, among other mechanisms.

It should be recognized that the present invention provides numerous benefits and advantages. For example, the volume of mixed material is minimized, which reduces the waste produced by flushing. In addition, the time required to flush is also minimized.

Although the present invention has been described with reference to preferred embodiments, workers skilled in the art will recognize that changes may be made in form and detail without departing from the spirit and scope of the invention.

The invention claimed is:

1. A mixing module comprising:
  a first inlet;
  a second inlet;
  a first plug member downstream of the first inlet and comprising a first seat portion having a first spherical portion;
  a second plug member downstream of the second inlet and comprising a second seat portion having a second spherical portion; and
  a valve mixer downstream of the first and second plug members, the valve mixer comprising:
    an integrator comprising:
      a first chamber with a first proximal end and a first distal end; and
      a second chamber with a second proximal end and a second distal end; and
    a valve member that is movable between a first position and a second position, and that further comprises a substantially spherical portion;
    wherein the valve member and the integrator are connected such that the integrator is movable with the valve member between the first position and the second position;
  wherein the first and second spherical portions are complementary to and configured to interact with the substantially spherical portion of the valve member;
  wherein the first inlet is fluidly connected to the first proximal end of the first chamber and the second inlet is fluidly connected to the second proximal end of the second chamber when the valve member is in the first position; and
  wherein the second inlet is fluidly disconnected from the first and second chambers and the first proximal end of the first chamber is fluidly connected to the second proximal end of the second chamber when the valve member is in the second position.

2. The mixing module of claim 1, wherein the valve member is rotatably movable between the first position and the second position.

3. The mixing module of claim 2, and further comprising:
  a handle connected to the valve member;
  wherein turning the handle no more than 90° moves the valve member between the first position and the second position.

4. The mixing module of claim 1, wherein the first inlet is fluidly disconnected from the first and second chambers when the valve member is in the second position.

5. The mixing module of claim 1, and further comprising:
  a third inlet;
  wherein the third inlet is fluidly connected to the first proximal end of the first chamber and to the second proximal end of the second chamber when the valve member is in the second position.

6. The mixing module of claim 5, wherein the valve member is also movable to a third position, the first, second, and third inlets being fluidly disconnected from the first and second chambers, and the first proximal end of the first chamber being fluidly connected to the second proximal end of the second chamber, when the valve member is in the third position.

7. The mixing module of claim 1, wherein the valve member is translated between the first position and the second position.

8. The mixing module of claim 1, and further comprising:
a knob connected to the valve member;
wherein twisting the knob at least 360° moves the valve member between the first position and the second position.

9. The mixing module of claim 1, wherein the first inlet is fluidly connected to the first proximal end of the first chamber and to the second proximal end of the second chamber when the valve member is in the second position.

10. The mixing module of claim 1, wherein the first inlet is a resin inlet and the second inlet is a catalyst inlet.

11. A method of operating a mixing module, the method comprising:
positioning a valve member comprising a substantially spherical portion in a mix position to block flow of a solvent from a solvent inlet;
at least partially securing the valve member in the mix position by exerting a force against the substantially spherical portion of the valve member using first and second plug members, wherein the first plug member is upstream of the valve member and comprises a first seat portion having a first spherical portion, and the second plug member is upstream of the valve member and comprises a second seat portion having a second spherical portion, and wherein the first and second spherical portions are complementary to and configured to interact with the substantially spherical portion of the valve member;
flowing resin through a resin inlet into a resin chamber of an integrator, the resin inlet being upstream of the first plug member;
flowing catalyst through a catalyst inlet into a catalyst chamber of the integrator, the catalyst inlet being upstream of the second plug member;
mixing the resin and the catalyst;
moving the valve member to a flush position to fluidly connect the resin chamber and the catalyst chamber to the solvent inlet and to block flow of the resin and the catalyst; and
flowing solvent from the solvent inlet through the resin chamber and the catalyst chamber.

12. The method of claim 11, wherein moving the valve member to the flush position comprises turning a handle that is connected to the valve member no more than 180°.

* * * * *